Aug. 12, 1958  E. L. MORGAN  2,846,962
PROTECTIVE HOUSINGS

Filed July 13, 1955  3 Sheets-Sheet 1

INVENTOR
EDWARD L. MORGAN
by Stone, Boyden & Mack,
ATTORNEYS

Aug. 12, 1958     E. L. MORGAN     2,846,962
PROTECTIVE HOUSINGS

Filed July 13, 1955     3 Sheets-Sheet 2

INVENTOR
EDWARD L. MORGAN
by Stone, Boyden & Mack,
ATTORNEYS

Aug. 12, 1958   E. L. MORGAN   2,846,962
PROTECTIVE HOUSINGS
Filed July 13, 1955   3 Sheets-Sheet 3
FIG. 4
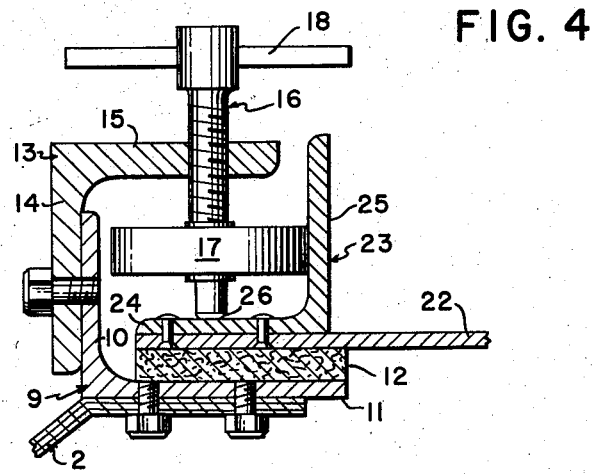
FIG. 5
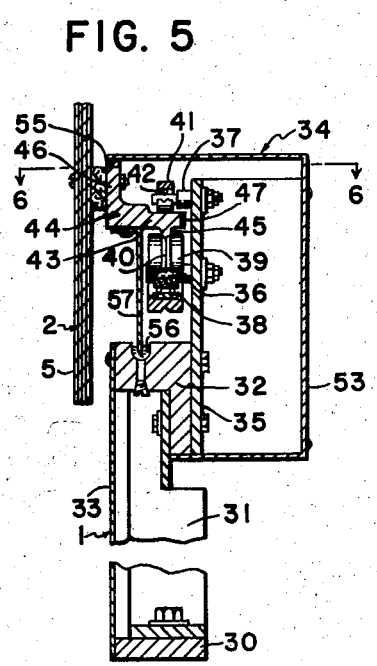
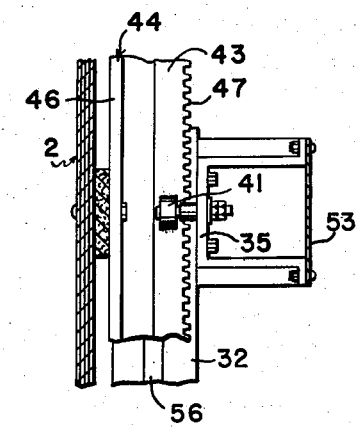
FIG. 6
INVENTOR
EDWARD L. MORGAN
by Stone, Boyden + Mack,
ATTORNEYS United States Patent Office 2,846,962
Patented Aug. 12, 1958

2,846,962
PROTECTIVE HOUSINGS

Edward L. Morgan, Asheville, N. C., assignor to Oerlikon Tool and Arms Corporation of America, Swannanoa, N. C., a corporation of Delaware Application July 13, 1955, Serial No. 521,730

7 Claims. (Cl. 108—2)

This invention relates to protective housings and more particularly to a novel and improved protective housing for use in connection with devices for tracking aircraft, missiles, and the like, in flight.

A typical tracking device to which the invention may be applied is the photo-theodolite apparatus briefly described at page 36 of Aviation Week for September 13, 1954. Such an apparatus comprises a photographic camera capable of recording an image of the missile or other object being tracked, such image being combined with a scale showing elevation and bearing of the object. A pair of optical viewing devices are employed, each used by a different operator, and the operators manipulate suitable control means for a power drive which adjusts the camera, in elevation and bearing respectively, to cause the camera to track the object. The entire mechanism is supported on a rotary pedestal, with seats for the operators being mounted on opposite sides of the pedestal.

Since the mechanism employed in such a tracking device is relatively delicate and costly, there has been a definite need for a protective housing which would substantially enclose the apparatus, yet allow freedom of movement thereof during the tracking operation.

An object of the present invention is to device a protective housing of this type which provides adequate protection for the tracking device and its operators, yet in no way hinders operation of the tracking device.

Another object is to provide such a protective housing including a fixed base structure and a rotatable top structure, with novel and efficient means for so supporting the top structure that the same may be readily rotated in synchronism with the movements of the tracking device.

Yet another object is to provide, in such a protective housing, an improved rotatable connection and seal between the fixed and rotary structures thereof.

A further object is to devise an improved protective housing construction of the type referred to wherein actuation of the rotary top structure, or dome, is accomplished through drive means including a ring gear, and the ring gear is also employed in a novel manner for mounting the rotary top structure on the base.

In order that these and other objects of the invention may be understood in detail, reference is had to the accompanying drawings, which form a part of this specification, and wherein:

Fig. 4 is a vertical sectional view, taken on line 4—4, Fig. 3, on an enlarged scale;

Fig. 5 is a vertical sectional view, taken on line 5—5, Fig. 3, on an enlarged scale;

Fig. 6 is a detail horizontal sectional view, taken on line 6—6, Fig. 5, on an enlarged scale with some parts shown in plan.

Figure 7:
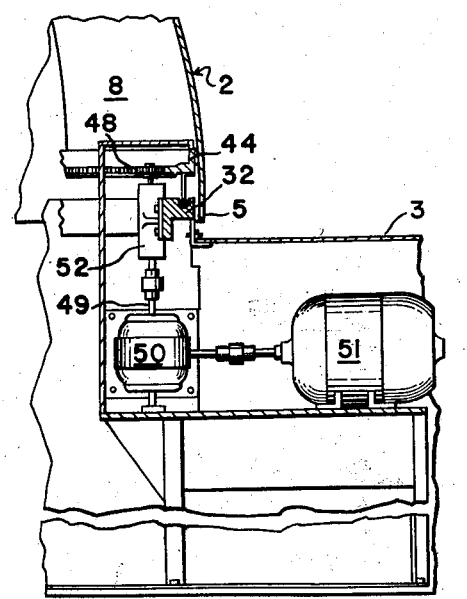
Fig. 7 is a vertical sectional view, taken on line 7—7, Fig. 3, on an enlarged scale.

Referring now to the drawings in detail, it will be seen that the embodiment of the invention here disclosed comprises an upright cylindrical base structure 1, a rotary top structure or dome 2 mounted above the base structure, and an annex 3 joined to the base 1 and provided to house the drive mechanism hereinafter referred to. It will be understood that the cylindrical base 1 is of such size that it may enclose the tracking device and its operator or operators and allow free movement of the tracking device relative to the base. A suitable door 4 is provided for the operating personnel. The top structure 2 includes a cylindrical dependent skirt 5 which, as best seen in Figs. 5 and 7, surrounds, but is spaced outwardly from, the top of the cylindrical base 1.

Figure 1:
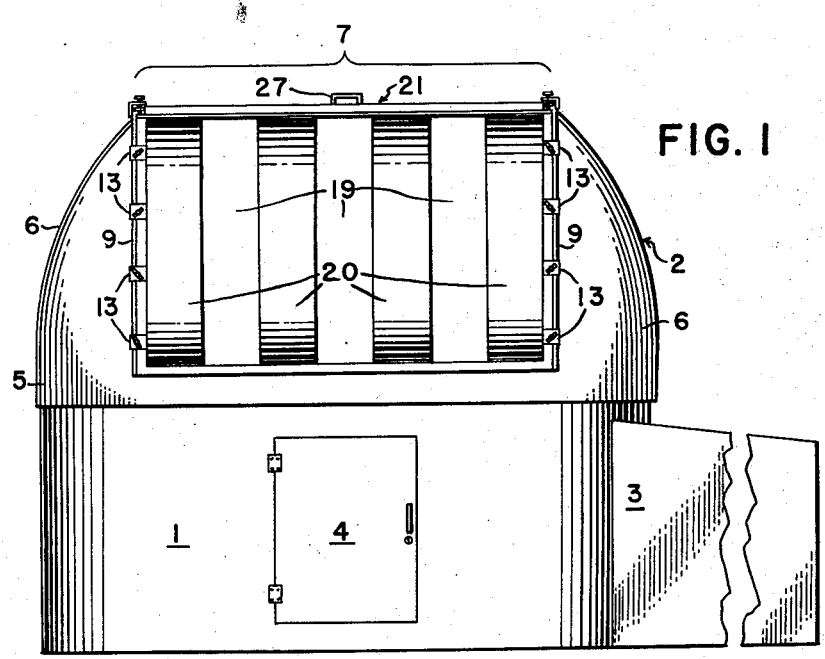
Fig. 1 is an elevational view of a protective housing constructed in accordance with one embodiment of the invention.
Figure 2:
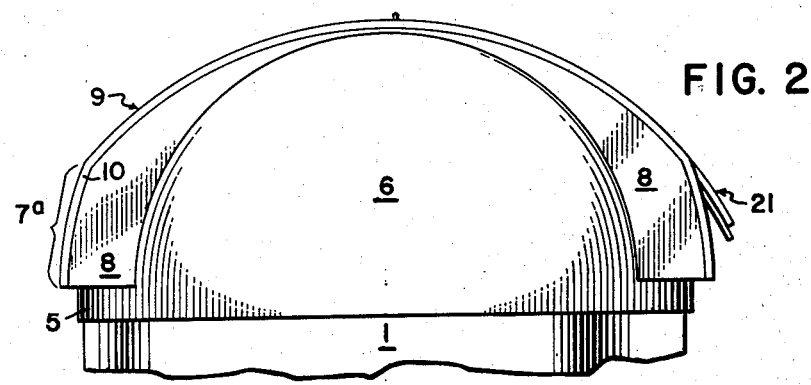
Fig. 2 is a fragmentary elevational view, similar to Fig. 1, with the top or dome structure of the device rotated 90° relative to the position shown in Fig. 1.
Figure 3:
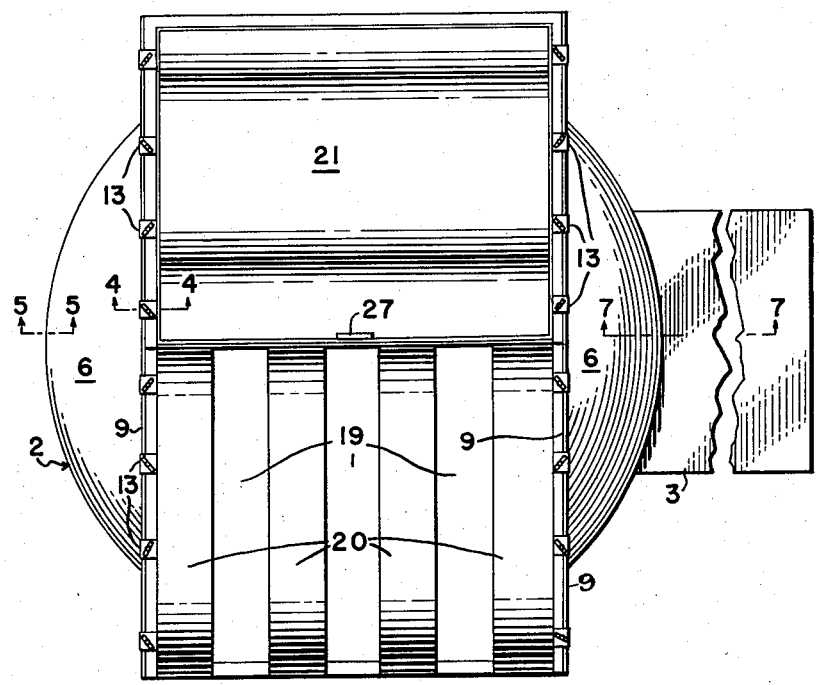
Fig. 3 is a plan view of the device of Fig. 1.

As seen in Figs. 1–3, the top structure 2 includes what may be termed generally spherical end portions 6. Between such end portions, the top structure includes a main portion 7 which is generally semi-cylindrical in shape. In order that the portions 6 and 7 may be joined in a continuous structure, the portion 7 is provided with end walls 8, as seen in Figs. 2 and 3. The top structure or dome 2 may be fabricated from laminated fiberglass-reenforced plastic material. Portions 5, 6 and 8 may be formed as an integral unit, or as separate units joined by any suitable conventional fabricating procedure. As best seen in Fig. 4, the side edges of the generally semi-cylindrical portion 7 are defined by angle members 9 bolted to the sheet material of the dome. Each of the angle members 9 extends continuously along one entire side of the portion 7 and is so positioned that one web 10 extends vertically upward from the dome. The other web 11 of each angle member 9 lies horizontally and has secured to its upper surface a continuous bearing strip 12 of felt or other suitable material. Secured to the web 10 of angle members 9 at suitably spaced intervals are a plurality of angle brackets 13 each having one web 14 bolted to web 10 and the other web 15 extending parallel to, but considerably above, web 11. Webs 15 of the angle brackets are provided with threaded openings receiving the threaded body of combination hold down and guide roller mounting devices 16. The devices 16 each carry a freely rotatable guide roller 17, and are provided with a suitable adjusting handle 18.

Over one half of its extent, the generally semi-cylindrical portion 7 is constituted by a continuous curved sheet joined to the end walls 8. Over the other half of its extent, however, sighting openings 19, Figs. 1 and 3, are provided for operation of the tracking device to be protected by the housing. In the present embodiment, such openings are defined by removable members 20. In order that the sighting openings 19 may be closed when the tracking device is not in use, I provide a sliding door 21 of arcuate form. As seen in Fig. 4, door 21 comprises a body member 22 of sheet metal or the like and side members 23 of right angle cross-section, the angle members 23 each having one web 24 secured flush to the sheet body 22 and the other web 25 extending vertically parallel to web 10 of the adjacent angle member 9. Thus, the guide rollers 17 contact webs 25 of angle members 23 and thus guide door 21 in its travel between its inactive position, seen in Fig. 2, and its active position closing openings 19. It will be noted that the edge portions of the door ride on the felt or like strips 12, and that the threaded members 16 may be turned down until tip 26 engages web 24 of angle members 23. Thus, by manipulation of members 16, the pressure on the felt strip may be adjusted and, when desired, the door 21 may be locked against movement. The door may be manipulated by a suitable handle 27. In the embodiment illustrated, I have provided a front portion 7ª, Fig. 2, on portion 7, the portion 7ª being closed by a door panel (not shown) separate from door 21.

As seen in Fig. 5, the base structure 1 includes a frame comprising base ring 30, a plurality of spaced uprights 31 and an upper ring member 32. Sheet metal or like sheathing 33 is secured to such frame to complete the enclosure. Mounted on the upper ring member 32 are a plurality of bearing units 34 distributed about the ring member in a circular series. Each bearing unit 34 includes a support member 35 bolted to the inner surface of the ring member 32 and carrying a pair of vertically spaced, horizontally extending stub shafts 36 and 37. Rotatably supported on lower shaft 36, as by ball bearing 38, is a supporting roller 39 having a peripheral groove 40. Similarly, a hold-down roller 41 is rotatably supported on stub shaft 37, as by ball bearing 42.

Disposed between the rollers 39 and 41 of the bearing units 34 is the horizontally extending annular flange 43 of a ring gear 44. The upper surface of the flange 43 is directly engaged by the hold-down rollers 41, while the lower surface of the flange is provided with a dependent annular ridge 45 riding in the peripheral grooves 40 of the supporting rollers 39. It will be noted that ridge 45 and grooves 40 have matching, generally V-shaped cross-sections.

Ring gear 44 is provided at its outer periphery with a vertical flange 46 bolted to the top structure 2. The teeth 47 of the ring gear are provided on the annular inner surface of the horizontal flange 43 and are engaged with the driving pinion 48, Fig. 7, of the drive means. The pinion 48 is fixed to a vertical output shaft 49 of speed-reduction gearing 50, the latter being driven by an electric motor 51, which, along with its associated equipment, is housed in the annex 3. The motor 51 may be controlled by the apparatus disclosed in co-pending application Serial Number 519,390, filed July 1, 1955, by Walter R. Peck, in order that movements of the top structure 2, with its sighting openings 14, may be synchronized with movements of the tracking device enclosed in the protective housing. It will be noted that the vertical drive shaft 49 extends upwardly within the ring member 32 and is journalled in a bearing member 52 secured to ring member 32.

Referring again to Fig. 5, it will be seen that each bearing unit 34 is partially enclosed, on one side, top and bottom, by a housing 53. The lower portions of housings 53 directly contact the ring member 32, while the top wall of each housing carries an anti-friction bearing piece 55 positioned to ride freely on the upper edge of flange 46 of ring gear 44. To complete the sealed enclosure, both as to the bearing units 34 and the space between the base structure 1 and the top structure 2, there is provided an oil seal comprising an annular oil-receiving groove 56 in the upper surface of ring 32, and a dependent annular skirt 57 mounted on the lower surface of flange 43 of ring gear 44, as seen in Fig. 5.

From Figs. 5–7, it will be seen that the novel construction employed allows the ring gear to act not only as the means for imparting rotary motion to the dome 2 but also as the means for supporting the dome in its proper position above the base 1. By employing the ring gear as the supporting element engaged by the rollers of the bearing units, I am able to provide a simple and efficient construction wherein the problems of drive, anti-friction support, lateral restraint and sealing are all provided for in one compact mechanism.

I claim:

1. In a protective housing for a tracking device and its operator, the combination of a base structure having upstanding walls; a top structure arranged above said base structure and provided with at least one sighting opening; a first circular series of rollers mounted on one of said structures each for rotation about a horizontal axis, said first series of rollers being disposed in a horizontal plane; a second circular series of rollers mounted on said one structure, said second series of rollers being disposed in a horizontal plane spaced above the plane of said first series of rollers; a ring gear member mounted on the other of said structures and including an annular horizontally extending flange portion located between said first and second series of rollers and in contact with the rollers of each series, whereby said first and second series of rollers and said ring gear member form a bearing structure for said top structure in which said first series of rollers supports said top structure and said second series prevents upward movement thereof with respect to said base structure, said annular flange portion being provided with gear teeth on its inner periphery; means in combination in said bearing structure for preventing relative lateral displacement between said base and top structure, and drive means mounted on said one structure and including a vertical shaft disposed within said annular flange portion and carrying a driving pinion meshed with the teeth of said annular flange portion.

2. In a protective housing for a tracking device and its operator, the combination of a base structure having upstanding walls; a plurality of bearing units mounted on said base structure and disposed in a horizontally extending circular series, each of said bearing units including two vertically spaced rollers mounted for rotation about horizontal axes; a ring gear member secured to said top structure and including an annular horizontally extending internally toothed flange portion, said flange portion extending between the vertically spaced rollers of each of said bearing units and said rollers each being in contact with a face of said flange portion; and drive means mounted on said base structure and including a vertical shaft disposed within said annular flange portion and carrying a driving pinion meshed with said internally toothed annular flange portion.

3. A protective housing constructed in accordance with claim 2 and wherein each of the lowermost ones of the rollers of said bearing units is provided with a peripheral groove, and the horizontally extending flange portion of said ring gear member is provided on its lower face with an annular ridge engaged in the peripheral grooves of said lowermost rollers.

4. In a protecting housing for a tracking device and its operator, the combination of a base structure having upstanding walls; a ring member mounted on said walls and extending in a horizontal plane; a plurality of bearing units mounted on said ring member and disposed in a horizontally extending circular series, each of said bearing units including a pair of vertically spaced rollers; a top structure including at least one sighting opening, said top structure including a dependent skirt surrounding said ring member; a ring gear secured to said top structure and having an internally toothed horizontally disposed annular flange, said flange of said ring gear extending between the rollers of said bearing units with the lowermost rollers thereof contacting the lower surface of said flange and the uppermost rollers contacting the upper surface of said flange, and drive means mounted on said base structure and including a vertical drive shaft carrying a driving pinion meshed with said ring gear, said drive shaft being positioned within said ring member.

5. In a protective housing for a tracking device and its operator, the combination of a base structure having upstanding walls, a ring member secured to said base structure and disposed in a horizontal plane; a plurality of bearing units mounted on said ring member and extending in a horizontally disposed circular series; a top structure having at least one sighting opening; a ring gear secured to said top structure and disposed in a horizontal plane, said ring gear including an annular horizontal inwardly extending flange portion and said bearing units comprising horizontal bearing rollers disposed in contact with said flange portion, whereby said top structure is rotatably supported by said bearing units via the flange portion of said ring gear; a fluid seal between said ring member and said ring gear, said seal comprising a dependent annular flange carried by said ring gear and a fluid-receiving annular groove formed in the upper surface of said ring member and disposed to embrace the tip of said dependent annular flange, and drive means mounted on said base structure and including a driving pinion meshed with said ring gear.

6. In a protective housing for a tracking device and its operator, the combination of a base structure having upstanding walls; a ring member secured to said base structure and disposed in a horizontal plane; a plurality of bearing units mounted on said ring member and disposed in a horizontally extending circular series, each of said bearing units including a lower supporting roller and an upper hold-down roller spaced thereabove, said rollers being mounted for rotation about parallel horizontal axes; a top structure including at least one sighting opening, said top structure including a dependent skirt surrounding said ring member; a ring gear secured to said top member and disposed in a horizontal plane spaced above said ring member, said ring gear including an inwardly directed horizontally extending annular flange, said flange being disposed between the supporting and hold-down rollers of said bearing units; a dependent annular flange carried by said ring gear and disposed to embrace said series of bearing units, said ring member being provided at its upper surface with a horizontally extending annular fluid-receiving groove disposed in alignment with and receiving said dependent annular flange, and drive means mounted on said base structure and including a driving pinion meshed with said ring gear.

7. A protective housing constructed in accordance with claim 6 and wherein said lower supporting rollers of said bearing units are each provided with a peripheral groove, and said flange of said ring gear is provided with a dependent annular ridge engaged in the peripheral grooves of said supporting rollers.

References Cited in the file of this patent

UNITED STATES PATENTS

| | | |
|---|---|---|
| 416,364 | Hough et al. | Dec. 3, 1889 |
| 535,990 | Lowe | Mar. 19, 1895 |
| 1,798,810 | Rice et al. | Mar. 31, 1931 |

FOREIGN PATENTS

| | | |
|---|---|---|
| 603,823 | France | Jan. 13, 1926 |
| 906,989 | Germany | Mar. 18, 1954 |